Aug. 9, 1927.  L. S. LACHMAN  1,638,636
ELECTRICALLY WELDED GIRDER
Original Filed Nov. 9, 1923
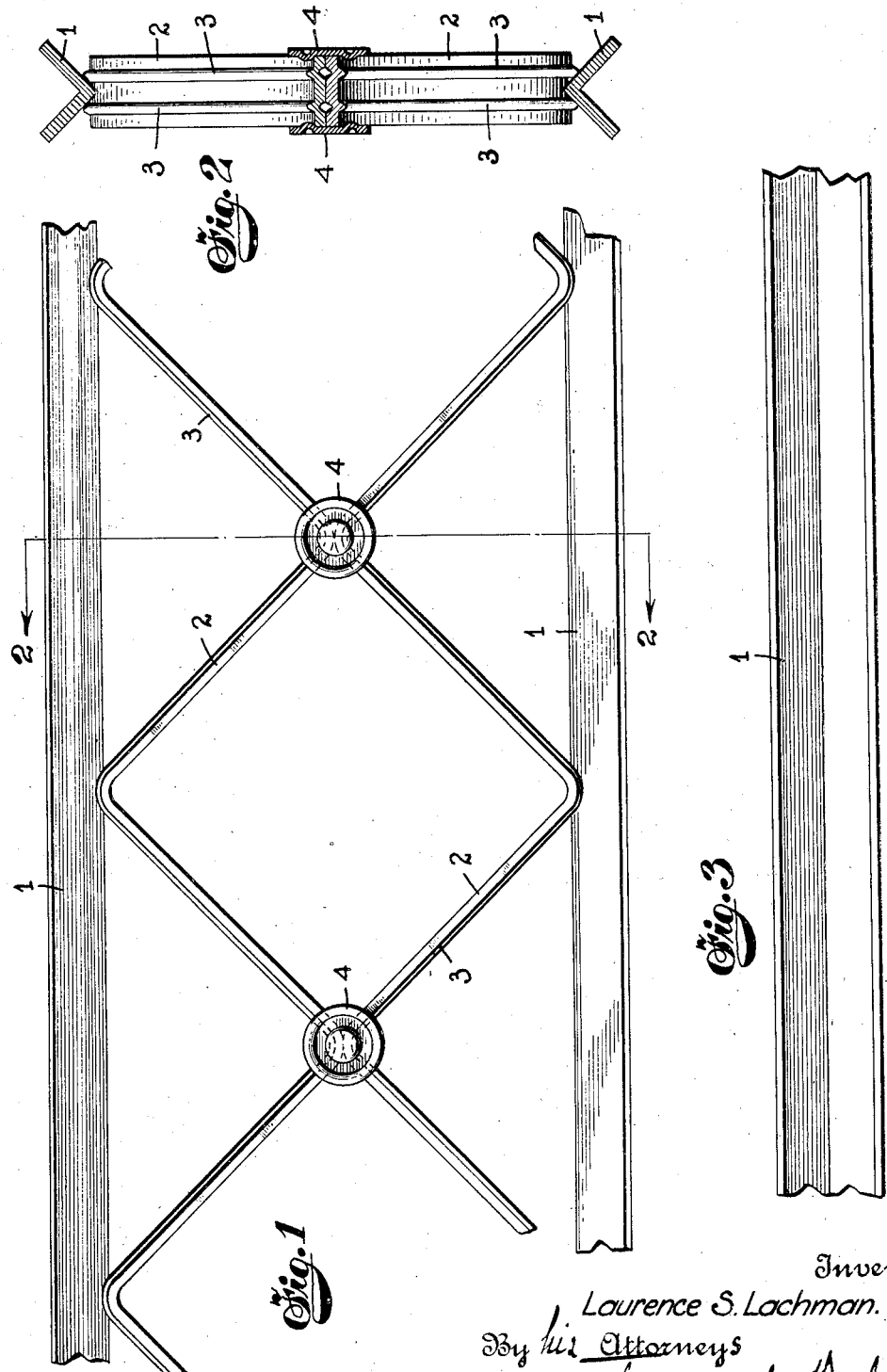
Inventor
Laurence S. Lachman.
By his Attorneys
Townsend + Decker.

Patented Aug. 9, 1927.

1,638,636

UNITED STATES PATENT OFFICE.

LAURENCE S. LACHMAN, OF NEW YORK, N. Y., ASSIGNOR TO UNIVERSAL ELECTRIC WELDING COMPANY, A CORPORATION OF NEW YORK.

ELECTRICALLY-WELDED GIRDER.

Application filed November 9, 1923, Serial No. 673,658. Renewed May 5, 1927.

My invention relates to electrically welded girders, beams or the like and more particularly to those wherein the connection between the upper and lower members or two longitudinals is afforded by a system of bars in contradistinction to a plate and applied in a manner to provide a skeleton girder wherein the diagonals cross to make what is sometimes called a lattice girder.

The object of my invention is to produce an electrically welded girder or the like of this general character in a manner to provide great strength or ability to withstand both vertical and lateral stresses and in a way to secure cheapness of construction and facility for application of the electrical resistance and pressure method of welding the parts together.

My invention consists of a girder or the like constructed as hereinafter described and shown in the accompanying drawings and then more particularly specified in the claims.

In carrying out my present invention I prefer to utilize features of construction described in my accompanying application, Ser. No. 673,657 filed November 9, 1923 wherein I have set forth a structure in which longitudinal members of the girder or the like comprise angle bars set in the same general plane and with the outer angles presented or projected toward one another, and the diagonal consists of a plate disposed with its plane transverse to the general plane of the girder and welded by the outside face of the bend in said plate to the outer angle or corner of the angle bar.

My invention, however, might be carried out by using other forms of longitudinal members suited for the welding of the angles of a zig-zag bar adapted to form diagonals by the bends of the zig-zag.

In the accompanying drawings:

Fig. 1 is a side elevation of a girder or the like embodying my invention.

Fig. 2 is a section on the line 2—2.

Fig. 3 is a plan of Fig. 1.

The two longitudinals or the upper and lower members of the structure shown at 1 consist preferably of angle bars disposed in the same general plane and with the outer angles projected toward one another. To each of said longitudinals is welded a zig-zag bar 2, said zig-zag bar consisting preferably of a flat bar with its edge presented laterally, or in other words with the plane of the bar arranged transverse to the general plane of the structure. By preference likewise each of said bars is provided with a pair of indented ribs 3 between which and to the upper face of the bend forming the zig-zag, the upper angle or corner of the bar 1 is welded as described in my companion application by the use of the electrical resistance and pressure method. By the expression "indented ribs," I mean the ordinary struck up ribs whereby on one side of the bar there are the projecting elements 3 and on the other side there are depressions or grooves 3'. Alternating bends of each zig-zag 2 are thus welded to the horizontals by the outer face of the bend while the intermediate bends of the two bars respectively meet so that when they are welded to one another a girder or the like of the lattice type will be formed or in other words one wherein the diagonals cross one another. The intermediate bends thus presented to one another may be welded electrically directly to one another, the curve of the bends aiding the process because of the small area of contact afforded for passage of the current and development of heat. The heating effect is enhanced furthermore, by reason of the fact that, where the bends engage each other where the area is restricted due to the indentations. The strength of the union at the crossing points of the diagonals may be further increased by electrically welding them together by the use of rigid buttons 4 applied to opposite edges of the plates 2 and welded thereto by the application of electric heating current and pressure as well understood in the art. These buttons firmly secure the two zig-zags together at the crossings of the lattice and further are useful in taking care of any failure of the bends to exactly align with one another when the parts are assembled in the welding machine.

What I claim as my invention is:

1. A structural beam comprising parallel angle members, the apices thereof opposed to each other, two zigzag bars each provided with parallel indented ribs, each of the zigzag members being electrically welded at its outer bends to the apex of an angle member so that the sides of the angle seat upon the ribs, and the inner bends of the angle members being electrically welded at their grooved surfaces.

2. A structural beam comprising parallel angle members, the apices thereof opposed to each other, two zigzag members, the planes of which are transverse to the general plane of the beam, each provided with parallel indented ribs, and each electrically welded at its outer bends to the apex of an angle bar, so that the sides of the angle seat upon the ribs and the inner bends thereof being electrically welded to each other at their grooved surfaces.

3. A structural beam comprising parallel angle members, the apices thereof opposed to each other, two zigzag members each provided with parallel indented ribs, each of the zigzag members electrically welded at its outer bends to the apex of an angle member, so that the sides of the angle seat upon the ribs, and the inner bends of the angle members being electrically welded at their grooved surfaces, and buttons lapping the meeting bent portions and welded to the edges of the latter.

Signed at New York in the county of New York and State of New York this 8th day of November, A. D. 1923.

LAURENCE S. LACHMAN.